United States Patent Office 3,316,653
Patented May 2, 1967

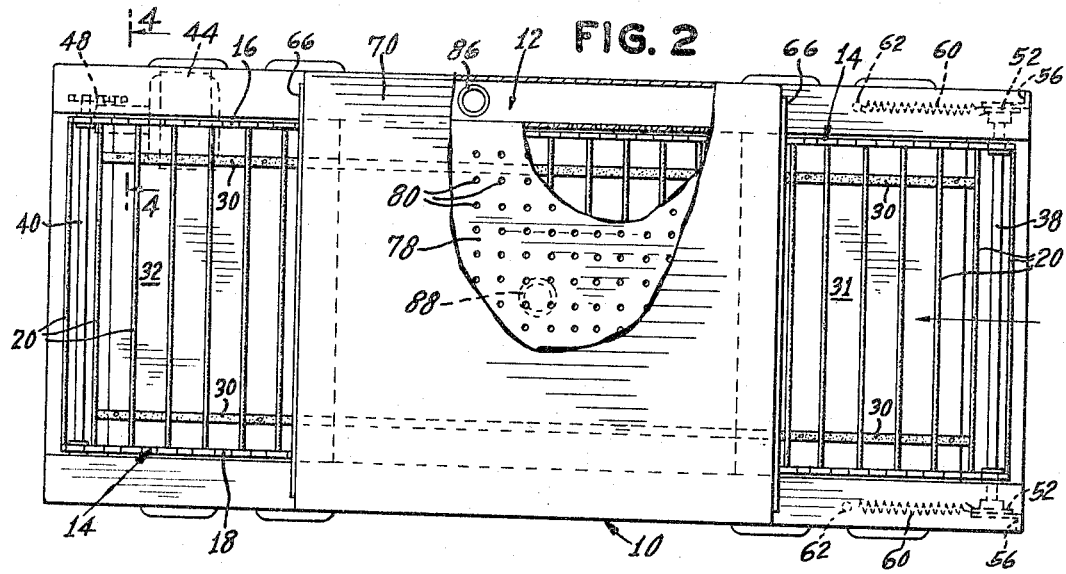
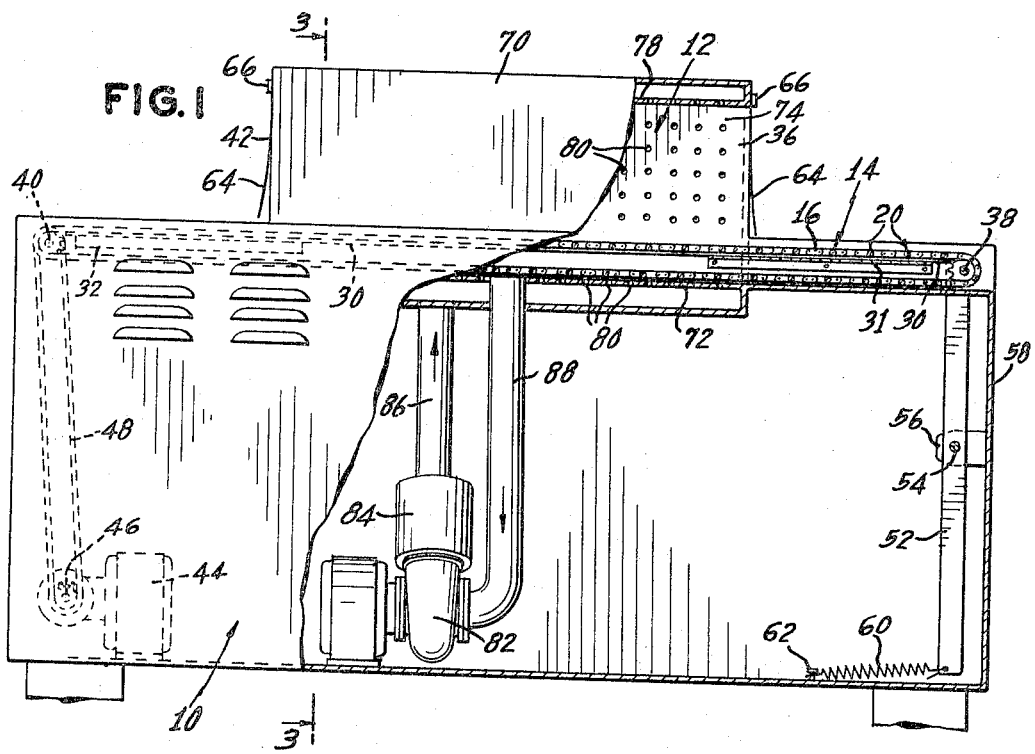

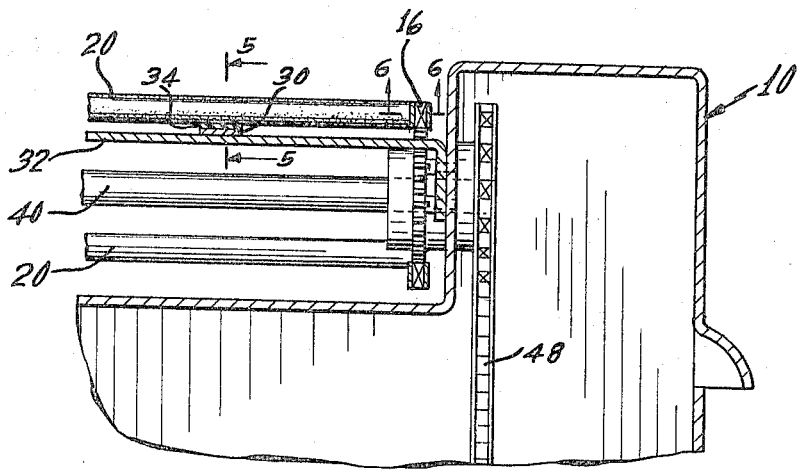

3,316,653
PROCESS AND APPARATUS FOR SHRINKING FILMS ON PACKAGES
Seymour Zelnick, Toms River, N.J., assignor to Weldotron Corporation, Newark, N.J., a corporation of New Jersey
Filed Nov. 18, 1963, Ser. No. 324,485
4 Claims. (Cl. 34—22)

This invention relates to shrinking of heat-shrinkable thermoplastic films on packages.

An object of this invention is the provision of a process and an apparatus for the heat shrinking of heat shrinkable thermoplastic film wrapper about packages to provide the package with a wrapper which is taut and unblemished on each of its surfaces.

A feature of this invention is the heating of all of the surfaces including the bottoms of heat shrinkable thermoplastic coverings about individual packages by supporting each such package on a plurality of sequentially spaced apart rollers, each of such rollers being coated with a material which is heat resistant and which precludes any adhesion thereto of the heated thermoplastic covering, and advancing such rollers over a source of hot air while rotating such rollers to advance each such package supported by such rollers with respect to such rollers in the direction of advance of such rollers to continuously and progressively change the portions of the respective bottoms of such packages which are contacted by such rollers; and continuously blowing hot air at the tops and sides, and between adjacent spaced apart rollers, against the continuously differing exposed portions of the respective bottoms of such packages, thereby applying hot air to the entire bottom of each such package.

The above and other objects, features and advantages of the invention will be fully understood from the following description considered in connection with the accompanying illustrative drawings.

In the drawings:

FIG. 1 is a side view of the apparatus partly in elevation and with parts cut away for the purposes of illustration;

FIG. 2 is a top plan view of the apparatus;

FIG. 3 is a sectional view on the line 3—3 of FIG. 1;

FIG. 4 is a sectional view on the line 4—4 of FIG. 2; and

FIGS. 5 and 6 are sectional views on the lines 5—5 and 6—6, respectively, of FIG. 4.

Referring to the drawings in detail, the apparatus of the present invention comprises a housing 10, a heating chamber 12, and an endless conveyor 14 for moving the wrapped packages through said tunnel for the heat-shrinking operation.

The conveyor 14 is of the endless sprocket chain type and comprises the endless sprocket chains 16 and 18 to which the opposite ends of the laterally spaced package supporting rollers 20 are connected. The chains 16 and 18 are of the hollow pin type and, as shown by FIG. 5, each roller 20 comprises a steel rod 22 which is mounted at its opposite ends in the transversely aligned hollow pins of the transmission chains 16 and 18 and held in position by the press nuts 24 or in any other suitable way. A seamless steel tube 26 is carried by each rod 22 in close fitting relation therewith but free to rotate around the axis of the companion rod 22. Each roller 20 comprises an outer sleeve 28 formed of a suitable heat resistant material, for example a composition of fibreglass and silicone rubber which also prevents adhesion of the thermoplastic film to the rollers which might otherwise occur at the elevated temperature at which the wrapper-shrinking operation is performed.

The rollers in the upper run of the conveyor 14 engage and are supported by laterally spaced steel bars 30 which extend longitudinally of the apparatus and are supported by the upper horizontal walls or brackets 31 and 32 of the housing 10. A layer 34 of a silicone rubber and fibreglass composition is secured to the upper surface of each of said bars 30 to provide friction engagement between the rollers 20 and the supporting bars 30.

As a result of the engagement of the rollers with supporting bars 30 while the rollers move longitudinally of said bars during the movement of the conveyor chains 16 and 18 through the heating chamber, the rollers are rotated about their own axes and thereby move the packages supported on the rollers transversely of the rollers in the direction of the movement of the conveyor through the heating chamber so that the bottom surfaces of the film covering on the package is exposed throughout its surface area to the hot air which flows through the heating chamber as hereinafter more particularly described.

The brackets 31 and 32 which support the bars 30 are positioned horizontally in the space between the upper and lower runs of the chains 16 and 18 and extend between and are secured to the opposite side walls of the housing 10. Bracket 31 extends lengthwise from a point near the entry end 36 of the heating chamber to a point near but short of the sprocket chain shaft 38. The bracket 32 extends from a point near but clear of the sprocket chain drive shaft 40 to a point near the exit end 42 of the chamber 12. The sprocket wheel drive shaft 40 is power driven by a motor indicated at 44 which has a sprocket wheel shaft 46 of speed reduction gearing connected to the sprocket wheel of the drive shaft 40 by a sprocket chain 48.

Provision is made for preventing looseness of the sprocket chains 16 and 18 which might be caused by expansion of the links of the chain under the effect of the heat while the sprocket chains pass through the heating chamber 12. For this purpose the bearings 50 for the shaft 38 which mounts the sprocket wheels of the sprocket chains 16 and 18 are each carried by an automatically adjustable support 52, one of said supports being positioned near one side wall of the housing and the other support being positioned near the opposite side wall of the housing. Supports 52 are pivotally mounted on a cross rod 54, the opposite ends of which are each secured in a companion bracket 56 fastened to the end wall 58 of housing 10. A tension spring 60 is secured at one end thereof to the lower end portion of shaft support 52 and at its other end to a stud 62 fixed to the bottom of the housing 10. It will be understood that upon expansion of the sprocket chains, the supports 52 for the sprocket chain shaft 50 will be pivoted in a clockwise direction, viewing FIG. 1, so as to take the slack with the result that the sprocket chains will at all times be under tension as a result of the force of the tension springs 60.

The openings at the opposite ends of the chamber 12 through which the wrapped packages enter and leave said chamber, being carried therethrough by the conveyor 14, are each provided with a flexible curtain 64 which is secured at its upper edge only to the end wall of the heating chamber in any suitable way, as by a fastening band 66. In accordance with the present invention, each of the curtains 64 comprises a plurality of individually movable sections, here shown as four sections 68. It will be understood that the curtains 64 reduces the admission of unheated air into the heating chamber 12 and this function is improved by the sectional construction of the curtains 64. Packages which are placed on the conveyor 14 for passage into the heating chamber will engage one or more sections of the curtain 64, depending upon the size of the package, and will move said curtain sections inwardly of the chamber until the package clears the engaged section or sections of the curtain, after which said sections will move by gravity to their chamber closing position. Packages which are moved by the conveyor out of the heating chamber 12 will, upon arriving at the exit opening of the chamber, engage one or more sections of the curtain 64, depending upon the size of the packages, and will move said curtain section or sections outwardly away from said heating chamber until the packages clear the engaged curtain sections which thereupon move by gravity to their chamber closing positions.

The heating chamber 12 is disposed within an outer casing 70 which surrounds and is spaced from the bottom wall 72, the opposite side walls 74 and 76 and the top wall 78, forming an air distribution chamber, said walls 72, 74, 76 and 78 of the heating chamber having a multiplicity of holes 80 therein for the passage of air into the chamber from outer casing 70. An air blower 82 is connected to the inlet of an electrical heater 84, the outlet tube 86 of which is connected to the lower part of casing 70 so that electrically heated air is supplied under pressure to the heating chamber 12 passing into said chamber through the previously mentioned holes in the walls of said chamber. The bottom of the heating chamber 12 is connected by a tube 88 to the inlet end of blower 82 for recirculation of the heated air from the chamber 12 to the electric heater 84 and from the latter to the hot air distribution chamber 70.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A process of uniformly heating all surfaces including the bottoms of heat-shrinkable thermoplastic coverings on individual packages, comprising: supporting each such package on a plurality of sequentially spaced apart rollers and advancing such rollers over a source of hot air while rotating such rollers to advance each such package supported by such rollers with respect to such rollers in the direction of advance of such rollers to continuously and progressively change the portions of the respective bottoms of such packages which are contacted by such rollers; and continuously blowing hot air from the top, sides and between adjacent spaced apart rollers, against the continuously differing exposed portions of the respective bottoms of such packages, thereby applying hot air to all of the surfaces including the entire bottom of each such package.

2. A process according to claim 1 wherein each of such rollers is coated with a material which is heat resistant and which precludes any adhesion thereto of the heated thermoplastic covering.

3. Apparatus for the heating of heat-shrinkable thermoplastic coverings about individual packages, comprising: a chamber; conveying means for carrying such packages through said chamber; said conveying means including two laterally spaced apart, longitudinally extending, endless flexible members, disposed for longitudinal movement through said chamber, a plurality of rollers, each carried by and between said two flexible members, in sequentially, spaced apart relation, for supporting and carrying such packages through said chamber, means for engaging a number of said rollers when disposed within said chamber, for rotating each of such rollers about its own respective longitudinal axis, for advancing any package supported by such rollers longitudinally with respect to said conveying means in the direction of movement of said conveying means through said chamber, whereby continuously and progressively differing portions of the respective bottoms of such packages are contacted by such rollers; and means for blowing hot air into said chamber, against the top and sides and through said conveying means to the continuously differing exposed portions of the respective bottoms of such packages, thereby, during the carrying of each package through the length of said chamber, applying hot air to all of the surfaces including the entire bottom of each such package.

4. Apparatus according to claim 3 wherein each of such rollers has an outer surface of a material which is heat resistant and which precludes any adhesion thereto of the heated thermoplastic covering.

References Cited by the Examiner
UNITED STATES PATENTS

| | | | |
|---|---|---|---|
| 1,672,737 | 6/1928 | Skinner | 34—236 |
| 2,257,758 | 10/1941 | Murch | 198—208 |
| 2,671,279 | 3/1954 | Blanchard | 34—240 |
| 3,014,320 | 12/1961 | Harrison | 53—30 |
| 3,120,728 | 2/1964 | Snow et al. | 53—184 |
| 3,164,939 | 1/1965 | Burke | 53—184 |
| 3,226,839 | 1/1966 | Monaghan | 34—225 |

MARTIN P. SCHWADRON, *Primary Examiner.*

JOHN J. CAMBY, FREDERICK L. MATTESON, JR.,
*Examiners.*

B. L. ADAMS, *Assistant Examiner.*